United States Patent [19]

Kipke

[11] Patent Number: 5,286,199
[45] Date of Patent: Feb. 15, 1994

[54] ELECTROMECHANICAL TRANSDUCER

[76] Inventor: Siegfried Kipke, Horber Gaessle 13, 7240 Horb-Nordstetten, Fed. Rep. of Germany

[21] Appl. No.: 956,647

[22] Filed: Oct. 2, 1992

[30] Foreign Application Priority Data

Oct. 4, 1991 [DE] Fed. Rep. of Germany ....... 4133000

[51] Int. Cl.$^5$ ...................... G09B 21/00; H01L 41/04
[52] U.S. Cl. ..................... 434/114; 434/112; 434/113; 310/311
[58] Field of Search .............. 434/112, 113, 114; 340/407, 825.19; 310/311, 317

[56] References Cited

U.S. PATENT DOCUMENTS

| 3,304,446 | 2/1967 | Martiner et al. | |
|---|---|---|---|
| 4,283,178 | 8/1981 | Tetzlaff | 434/114 |
| 4,633,121 | 12/1986 | Ogawa et al. | 310/332 |
| 4,761,582 | 8/1988 | McKee | 310/322 |
| 4,875,378 | 10/1989 | Yamazaki et al. | 73/862.04 |
| 5,165,897 | 11/1992 | Johnson | 434/113 |

FOREIGN PATENT DOCUMENTS

| 0067883 | 12/1982 | European Pat. Off. |
| 0170958 | 2/1986 | European Pat. Off. |
| 0400163 | 12/1990 | European Pat. Off. |
| 3728817 | 3/1988 | Fed. Rep. of Germany |
| 3713697 | 11/1988 | Fed. Rep. of Germany |
| 2087659 | 5/1982 | United Kingdom |

Primary Examiner—John J. Wilson
Assistant Examiner—Cindy A. Cherichetti
Attorney, Agent, or Firm—Michael J. Striker

[57] ABSTRACT

An electromechanical transducer comprise a piezoelectric transducer element (5), which is arranged in a pressurized chamber (3) filled with a fluid (4). The piezoelectric transducer element (5) can comprise a plurality of piezoceramic platelets connected with each other by thin-walled metallic contact platelets, which are also connected electrically to connector pins (10) on the outside of a housing (1) in which the pressurized chamber (3) is located. When a controlling voltage is applied to the connector pins, the transducer element (5) experiences a reversible deformation, which is transmitted to the fluid, so that an operating element (14) is raised above a contacting surface (16) according to the force on the fluid. The transducer element (5) can be separated from the fluid (4) by a membrane (17). The platelets can be connected to the connector pins via spring-like resilient conductive contact pieces for maintaining electrical contact when the piezoceramic platelets are in a deformed activated state. In the case of Braille modules for representing information for the blind the operating element (14) can be a pin detectable by touch. An array of modules of this type can be used to represent graphical information as well as letters and numbers.

8 Claims, 6 Drawing Sheets

ELECTROMECHANICAL TRANSDUCER

BACKGROUND OF THE INVENTION

The present invention relates to an electromechanical transducer.

Electromechanical transducers are known which convert an electrical signal into a reversible deformation of a piezoelectric transducer element and also allow a conversion of a force into an electrical signal.

Piezoelectric transducer elements are known, which convert an electrical signal into a change in shape of the transducer element. This type of transducer element has many applications so that, for example, electrical relays can be made using piezoelectric transducers. Also Braille-Modules using piezoelectric transducer elements for making type characters or other symbols in Braille are known.

A piezoelectric relay is described in European Patent Application EP 0 067 883 A1, in which electrical contacts are attached to the piezoelectric transducer element which are moved by applying an electrical potential to the transducer element because the transducer element is deformed or bends on application of the electrical potential. A piezoelectric relay, in which a longitudinal extension of the transducer element is used to operate the electric contacts is described in European Patent Application EP 0 170 858 A1.

A piezoelectric module for producing type characters or symbols detectable by touch in Braille is described in U.S. Pat. No. 4,283,178. This piezoelectric module has pins detectable by touch on the free ends of piezoelectric transducer elements, which can be in two states, a raised state in which they are detectable by touch(set) and a lowered state(erased). The displacement of the piezoelectric transducer element occurs, because an electrical potential is applied to it.

The Braille Module is used to produce character-oriented information so that it can be read by a blind person. The Braille writing used is made up of a plurality of Braille characters which are made by a symbol specific combination of point-like elevations arranged in a 2×3 or 2×4 matrix. The spacing between the point-like elevations in the Braille character is smaller than the spacing between adjacent Braille characters. Module constructed Braille characters can be used as an output medium for a personal computer output unit. However no raphical information such as diagrams can be displayed or converted with this kind of type character-oriented output medium in the form of lines of type characters.

SUMMARY OF THE INVENTION

It is an object of the present invention to provide an improved electromechanical transducer with a piezoelectric transducer element, with which a conversion of an electrical signal into a force and also a conversion of an applied force into an electrical signal can occur.

This object and others which will be made more apparent hereinafter are attained in an electromechanical transducer with at least one piezoelectric transducer element, which convert an electrical signal into a reversible deformation of a piezoelectric transducer element and also allow a conversion of an applied force into an electrical signal.

According to the present invention, the electromechanical transducer is provided with a pressurized chamber filled with fluid in which the at least one piezoelectric transducer element is located, and means for making an electrical connection to the piezoelectric transducer so that a voltage can be applied to the piezoelectric transducer element to deform the at least one piezoelectric transducer and force a portion of the fluid through the opening of the pressurized chamber and so that a change in an electrical property of the piezoelectric transducer element can be detected in response to a change in pressure applied to the at least one piezoelectric element via the fluid.

The piezoelectric transducer element is located in the pressurized chamber filled with fluid, whose fluid can be forced through the opening. The motion of the fluid in the vicinity of the opening can be converted into a motion or deformation of an operating element to produce a mechanical reaction corresponding to the electrical signal applied to the piezoelectric transducer.

In a preferred embodiment the pressurized chamber is connected to at least one pressurized duct, which has a cross-sectional area substantially smaller than the pressurized chamber. In some embodiments only one pressurized duct is connected to the pressurized chamber. The pressurized duct in those situations is connected at the opening of the pressurized chamber. A piston, which extends from an operating element, has the substantially the same cross-sectional area as the pressurized duct and extends slidably, but sealingly, into the pressurized duct from the outside. The operating element can serve for direct representation of information to be read by touch or for operation of an electrical contact of a relay. If the operating element is pressed down with a finger and because of that moves the piston in to the pressurized duct, a corresponding increased pressure is produced in the pressurized chamber. This increased pressure acts to deform the piezoelectric transducer element, which changes its electrical properties because of that. Thus a voltage change is produced at the contacts of the piezoelectric element depending on a certain pressure change. The electromechanical transducer can then also be used to input information by operation of the operating element. An elastically deformable wall portion acting as the operating element can be provided covering the opening to the pressurized chamber or the duct connected to it.

When a potential is applied to the piezoelectric transducer element a bulging out or bulging in of the elastic wall occurs according to the sign of the potential. This deformation of the wall may be detected by touch by hand so that because of that information can be read by touch. The deformation of the wall can also however operate an electrical contact.

The operating element can be used to operate different types of elements to perform different functions so that in some embodiments the operating element can operate a piston of a pump. In other embodiments the operating element itself can be a valve body of a valve.

The piezoelectric transducer element advantageously comprises one or more piezoceramic platelets, which are mounted on metallic contact platelets. A membrane is advantageously provided between the transducer element and the fluid located in the pressurized chamber. If an electrical potential is applied to the piezoceramic platelets, the expansion of the piezoelectric surface causes a bending, since the metallic contact plates connected with the piezoelectric platelets do not expand. The bending of the piezoelectric transducer element is used to force fluid from the pressurized chamber and thus to operate the operating element. When several piezoceramic transducers are positioned over each other in the form of a transducer packet, a suitable larger volume change is produced by that during application of the potential to it. Because of that larger displacements of the operating element occur and a better cross-sectional area ratio between the pressurized duct and the pressurized chamber can be achieved than in an embodiment with only one single transducer element. The cross-sectional surface area of the opening and of the pressurized duct subsequently connected to it as necessary is many times smaller than the surface area of the piezoelectric transducer element and/or than the cross-sectional area of the pressurized chamber. Because of that, a comparatively small volume change causes a comparatively large change of the fluid level in the vicinity of the pressurized duct.

It should also be mentioned that the fluid in the pressurized chamber can be a liquid or a compressible gas. Spring-like behavior can be obtained when a compressible gas is used as the fluid.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
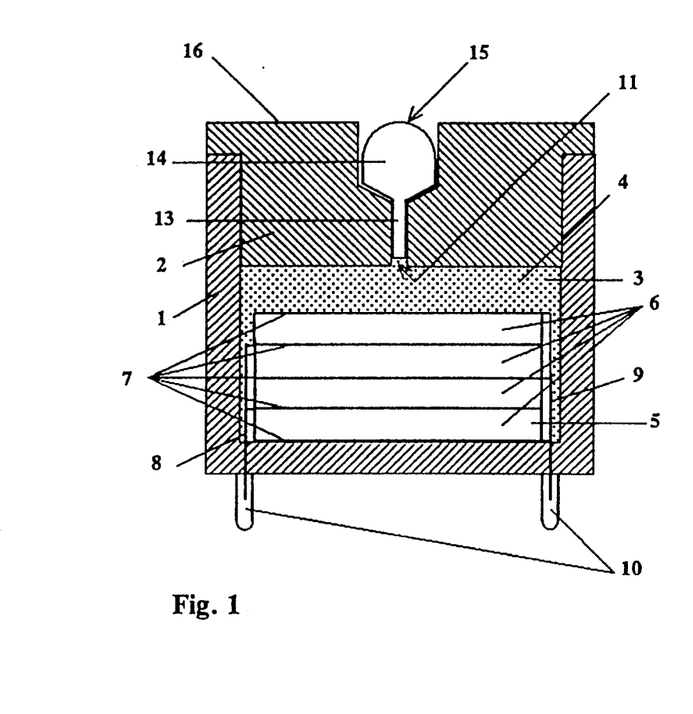
FIG. 1 is a detailed cross-sectional view of an electromechanical transducer according to the invention formed as a Braille Module (1-point module) with an operating element shown in a lowered position in which it cannot be detected by touch on the touching surface.

The module shown in FIG. 1 has a housing 1, which is closed on top by a cover 2. In the housing 1 a pressurized chamber 3 is located, in which a fluid 4 and a piezoelectric transducer element 5 are located. The transducer element 5 comprises a plurality of piezoceramic platelets 6, which are connected with each other by metallic surfaces which are formed as thin-walled contact platelets 7. Electrical connecting wires 8,9 form electrical connections between the contact platelets 7 and the connector pins 10 protruding from the bottom of the housing 1.

The pressurized chamber 3 is connected to a pressurized duct 12 formed in the cover 2 above an opening 11, in which a piston 13 of the operating element 14 engages from above. The piston 13 fits in the pressurized duct slidably, but sealingly, so that fluid cannot escape around the piston. The operating element 14 forms a displaceable element detectable by touch when raised, but which is lowerable so that its surface 15 is below the level of the contact surface 16. A displacement of the operating element 14 upwardly occurs when an electrical potential is applied to the connector pins 10 whereby the piezoceramic platelets 6 expand and thus the fluid 4 is forced from the pressurized chamber 3. The fluid 4 flows into the pressurized duct 12 so that piston 13 and thus the entire operating element 14 is raised and reaches the position as shown in FIG. 2 protruding above the contact surface 16.

Figure 2:
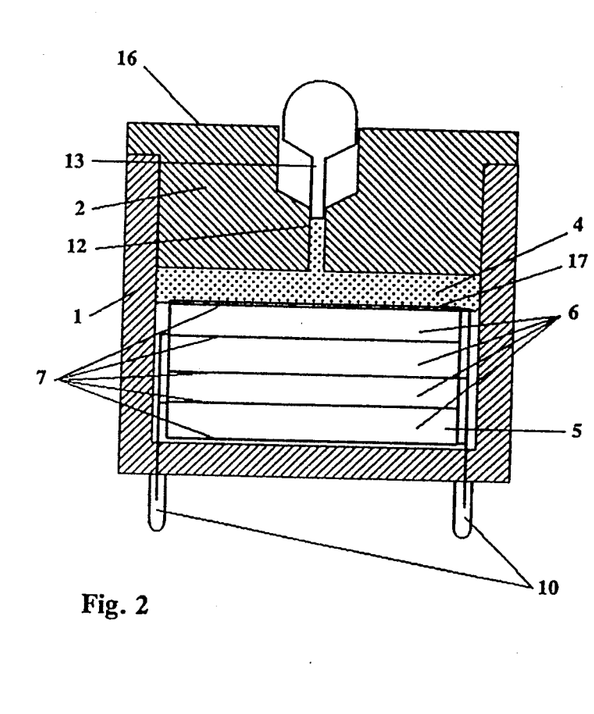
FIG. 2 is a detailed cross-sectional view of another embodiment of the electromechanical transducer with the operating element shown in a raised position in which it can be detected by touch.

In the embodiment of FIG. 2 a membrane 17 is arranged above the piezoelectric transducer element 5 and below the fluid 4, so that the fluid 4 is separated from the piezoelectric transducer element 5. The membrane 17 is elastic so that it can adjust to the height change and/or the volume change of the transducer element 5.

Figure 3:
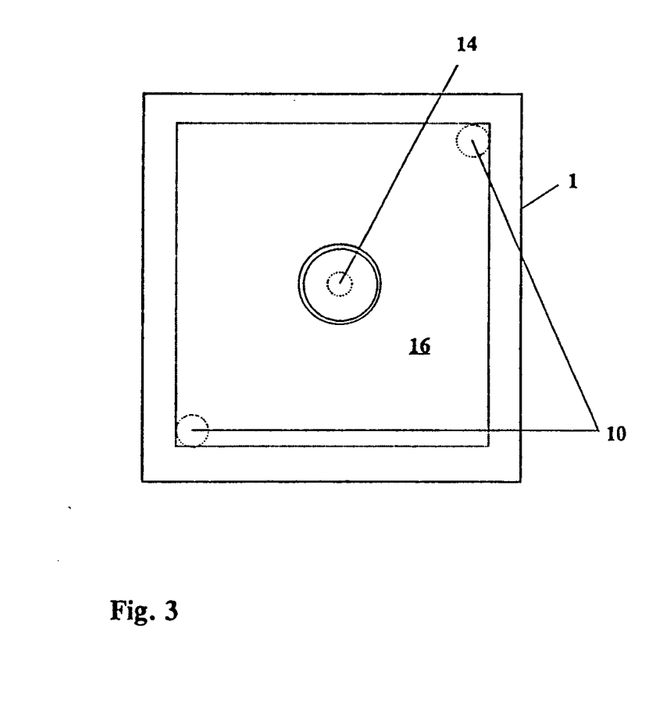
FIG. 3 is a top plan view of the electromechanical transducer of FIG. 1 according to FIG. 1.

In the top plan view of FIG. 3 the position of the connector pins 10 is shown with dotted lines, since these are located on the bottom side of the module.

Figure 4:
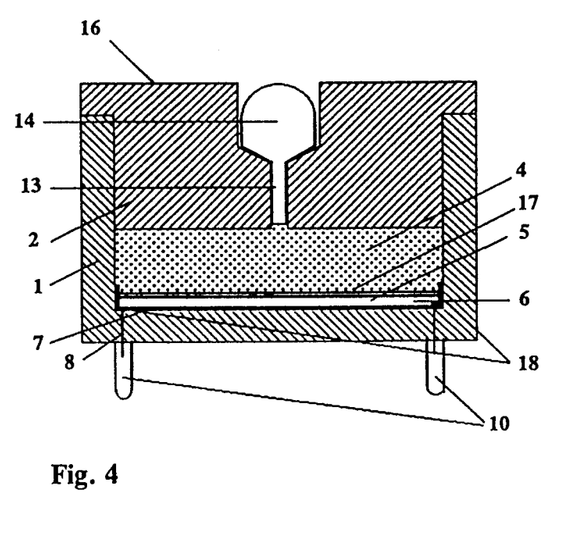
FIG. 4 is a cross-sectional view of another embodiment of an electromechanical transducer according to the invention with a piezoceramic platelet on a metallic contact platelet in a resting state.

FIG. 4 shows an embodiment of a Braille Module, whose piezoelectric transducer element 5 is in a resting state and which comprises a single piezoceramic platelet 6 and a metallic contact plate 7 below it as supporting member. The metallic contact plate 7 is covered with a membrane 17 made from rubber or a suitable elastic material on the top side of the transducer element 5.

The contact platelet 7 contacts on contact pieces 18 which are resilient and which make electrical contact with the connector pins 10. The contacting of the transducer element 5 is guaranteed by the resilient contact pieces 18, because of their deformation.

Figure 5:
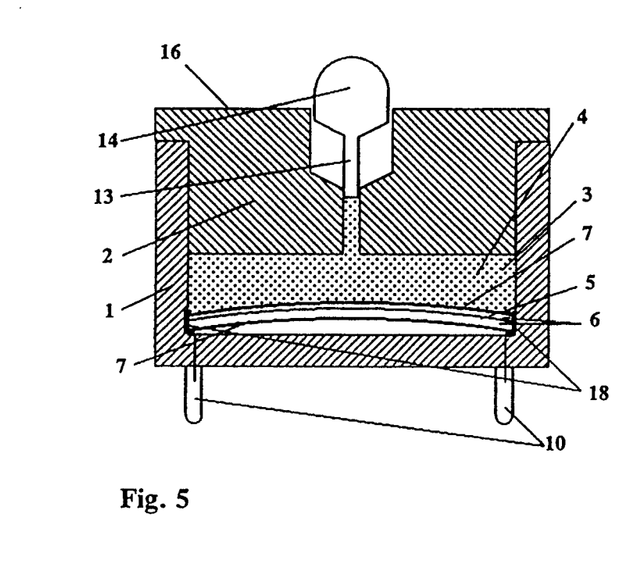
FIG. 5 is a cross-sectional view of the Braille Module of FIG. 4 in an activated state.

In FIG. 5 the module of FIG. 4 is shown with the piezoelectric transducer element 5 in an activated state so that the operating element 14 projects above the contact surface 16. The transducer element 5 is a comparatively small body having a cross-sectional shape corresponding to that of the pressurized chamber. With cylindrical pressurized chambers the transducer element 5 is shaped like a circular disk having a radius nearly equal to the radius of the cylindrical pressurized chamber, while with square cross-sectional shapes for the pressurized chamber 3 the transducer element is similarly square.

Figure 6:
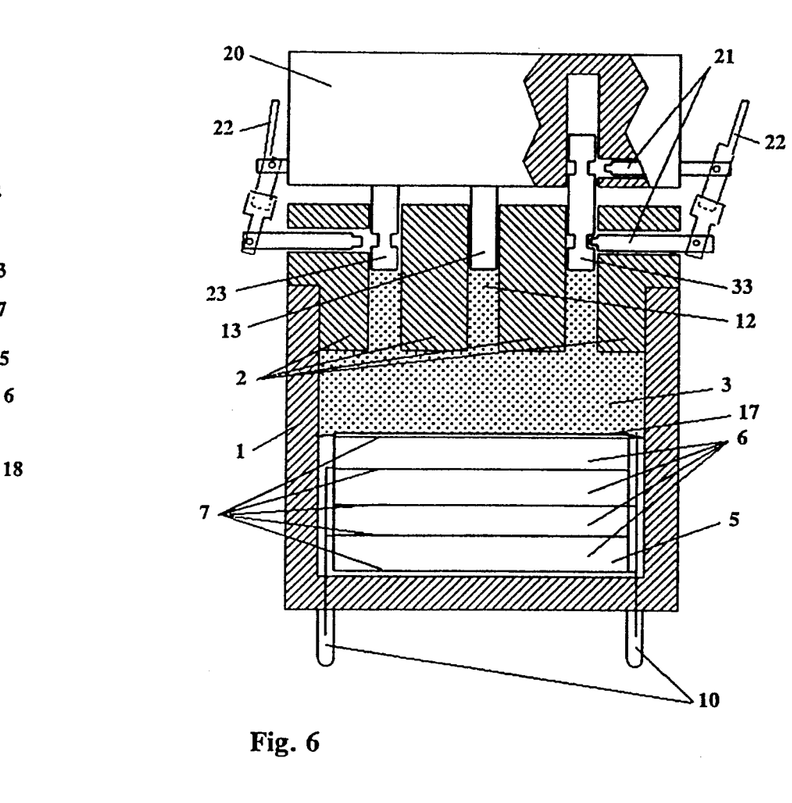
FIG. 6 is a cross-sectional view of an electromechanical transducer according to the invention with a lockable operating element acting as a force detector.

FIG. 6 shows another embodiment of an electromechanical transducer according to the invention useful in an application in which force is to be detected. FIG. 6 shows a force detector whose pressure transmitting element 20 has a piston 13, which projects into the pressurized duct 12. If the pressure transmitting element 20 presses downwardly, it causes an increase of pressure in the pressurized chamber 3, whereby a corresponding pressure is transmitted to the transducer element 5. The piezoelectric transducer element 5 produces a load shift depending on the pressure on it, which can be measured at the connector pins 10 in the form of a voltage. Additional pistons 23,33 can be connected or disconnected with the pressure transmitting element 20 by the connecting rods 21 pivotally connected to the operating levers 22. Because of that, the sensitivity of the force detector can be varied. The pressure transmitting element 20 can be put under tension to linearize its characteristic behavior by a biasing spring 40.

Figure 7:
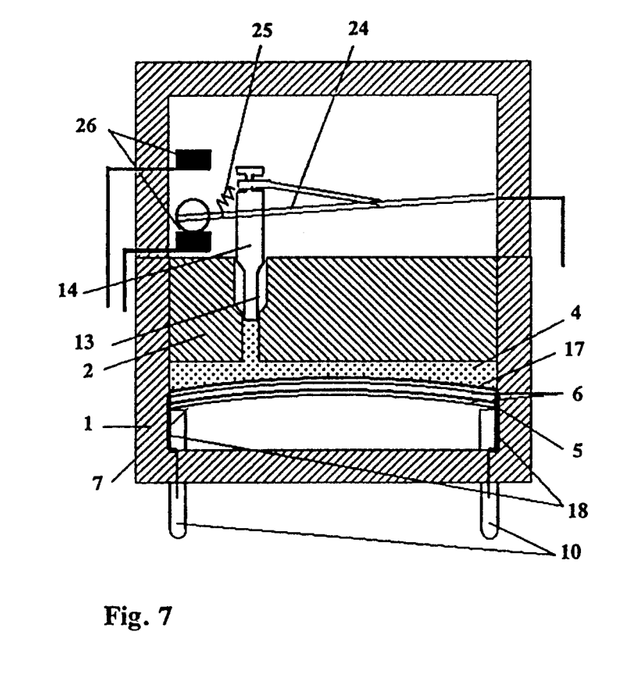
FIG. 7 is a cross-sectional view of an electromechanical transducer according to the invention with a piezoelectric transducer element acting as a relay.
Figure 8:
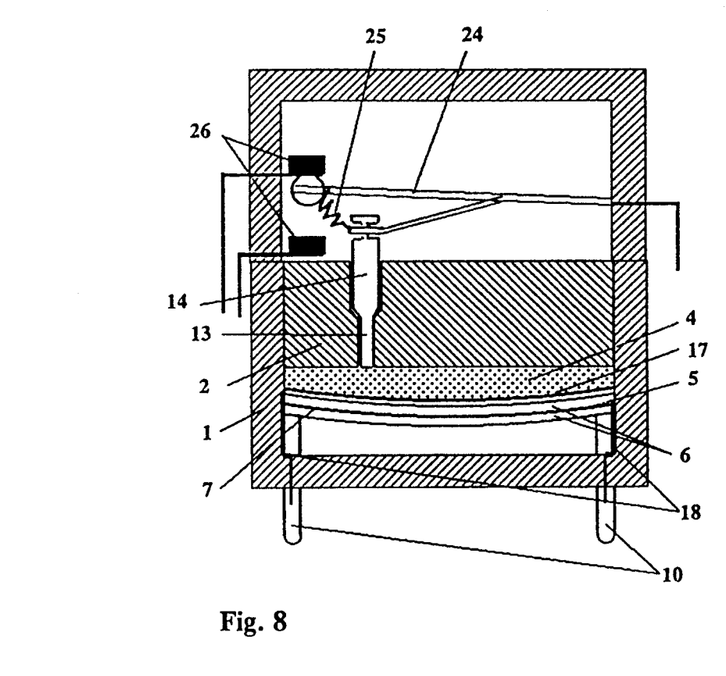
FIG. 8 is a cross-sectional view of the electromechanical transducer of FIG. 7 switched to another position.

FIG. 7 shows an embodiment of an electromechanical transducer according to the invention in the form of an activated relay with a piezoelectric transducer 5 in a state similar to FIG. 5. A voltage is applied to the connector pins 10, which produces a bulging of the piezoelectric transducer 5 upwardly so that a resilient contacting element 24 is operated with an operating spring 25 of the operating element 14. The resilient contacting element 24 can bring itself from the lower contact terminal 26 as shown in FIG. 7 to the upper contact terminal 26 as shown in FIG. 8. In FIG. 8 the piezoelectric transducer element bends bulged oppositely to that shown in FIG. 7, whereby a suitable switch contact is made.

Figure 9:
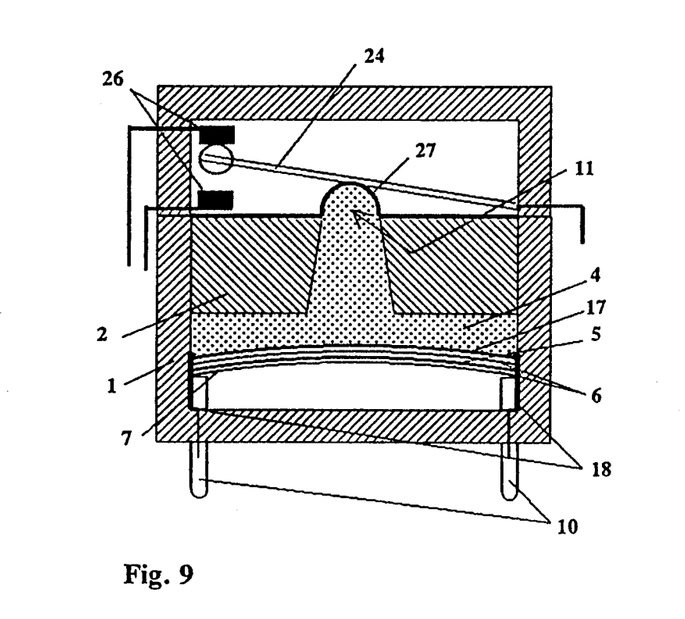
FIG. 9 is a cross-sectional view of another embodiment of an electromechanical transducer according to the invention with an elastic wall as operating element in an embodiment comprising a relay.

The piezoelectric transducer element 5 in the example according to FIGS. 7 and 8 comprises a metallic contact platelet 7, on which piezoceramic platelets 6 are attached to both sides. Because of that, the transducer element 5 can bend in both directions, whereby a suitable comparatively large displacement of the operating element 14 can be effected. In the relay shown in FIG. 9 the operation of the contact spring 24 occurs by deformation of an elastic wall 27, which forms the operating designated by 14 in the previous embodiments. The piezoelectric element 5 used in this embodiment is the same as in the embodiment of FIGS. 7 and 8.

Figure 10:
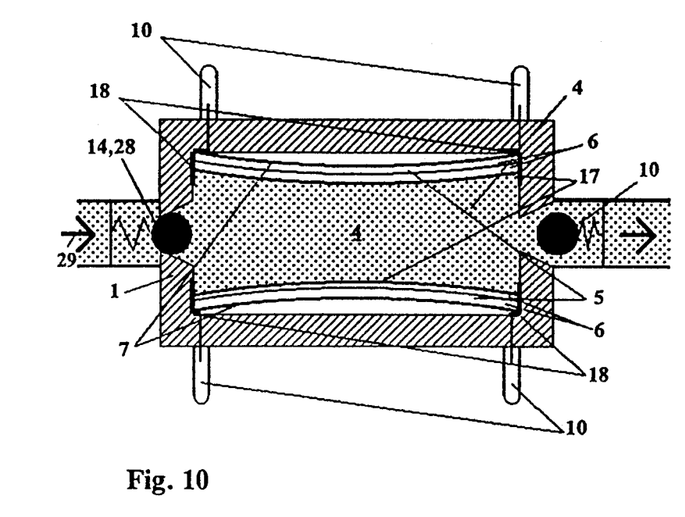
FIG. 10 is a cross-sectional view of an additional embodiment of an electromechanical transducer according to the invention acting as a pump whose operating element is the valve body of the pump.

In FIG. 10 an electromechanical transducer according to the invention is used as the principal part of a pump, which has two piezoelectric transducer elements 5. The operating element 14 is a valve body 28, which alternately opens and closes with alternating activation and deactivation of both transducer elements 5. Because of that, a fluid 4 can be pumped in the direction of the arrow 29.

Figure 11:
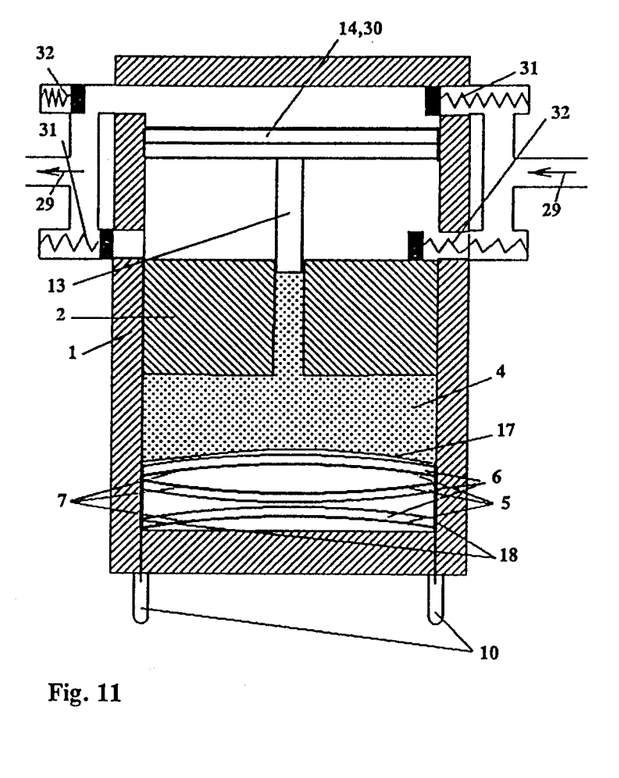
FIG. 11 is a cross-sectional view of another embodiment an electromechanical transducer according to the invention acting as a pump and having a piston as the operating element.

An additional application is shown in FIG. 11 in which the operating element 14 is a piston 30. According to the motion direction of the piston 30 the valves 31,32 open or close so that a fluid can be pumped in the direction of the arrow 29. The piezoelectric transducer element 5 comprises a plurality of individual elements, which are aligned oppositely to each other, i.e. on application of a control voltage to the connector pins 10 an additional bending occurs which leads to a maximum volume change.

There are many applications of the piezoelectric transducers and they are not limited to the examples shown. They are particularly advantageously applied to the problem of transmitting information by touch, since this can be done with a particularly simple module.

By placing these type of modules side-by-side a flat rastered Braille surface varying from the standard classical Braille can be produced. With the help of different displaceable elements detectable by touch additional information can be detected by touch, e.g. attributes such as character colors. Thus a three-dimensional representation accessible to touch is possible for graphical information.

Figure 12:
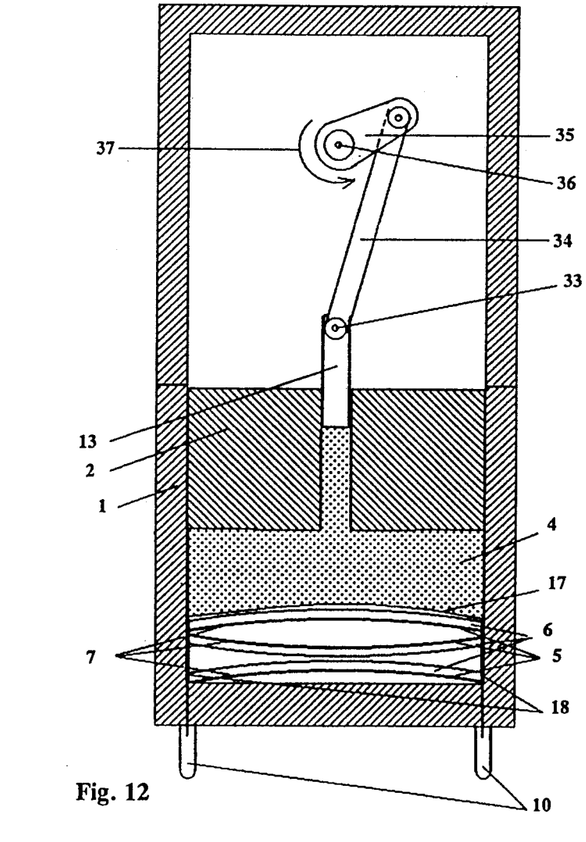
FIG. 12 is a cross-sectional view an electromechanical transducer according to the invention in an embodiment comprising a motor.

In FIG. 12 an electromechanical transducer operating as a motor is shown. This motor has a piston 13 slidably mounted in the pressurized duct of the pressurized chamber 3 and pivotally connected at a pivot 33 with a connecting rod 34, which rotates the rotatable drive shaft 36 in the direction of the arrow 37 via the pivotally connected eccentric element 35 with suitable control of the piezoceramic transducer element.

It will be understood that each of the elements described above, or two or more together, may also find a useful application in other types of constructions differing from the types described above.

While the invention has been illustrated and described as embodied in an electromechanical transducer and other devices using the electromechanical transducer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. An electromechanical transducer comprising at least one piezoelectric transducer element (5) structured to convert an electrical signal applied to said at least one piezoelectric transducer element into a reversible deformation of said at least one piezoelectric transducer element and also convert a force applied to said at least one piezoelectric transducer element into an electrical signal; a pressurized chamber (3) with an opening (11), said at least one piezoelectric transducer element (5) being located in said pressurized chamber (3); a fluid (4) filling said pressurized chamber; means (7) for making an electrical connection to said at least one piezoelectric transducer element for applying a voltage to said at least one piezoelectric transducer (5) to deform said at least one piezoelectric transducer element (5) so as to force a portion of said fluid through said opening of said pressurized chamber (3) and also for detecting a change in an electrical property of said at least one piezoelectric transducer element in response to a change in a pressure applied to said at least one piezoelectric element (5); and an operating element consisting of an elastically deformable wall (27) covering said opening (11).

2. An electromechanical transducer comprising at least one piezoelectric transducer element (5) structured to convert an electrical signal applied to said at least one piezoelectric transducer element into a reversible deformation of said at least one piezoelectric transducer element and also convert a force applied to said at least one piezoelectric transducer element into an electrical signal, a pressurized chamber (3) with an opening (11), a fluid (4) filling said pressurized chamber, said at least one piezoelectric transducer element (5) being located in said pressurized chamber (3), and means (7) for making an electrical connection to said at least one piezoelectric transducer element for applying a voltage to said at least one piezoelectric transducer (5) to deform said at least one piezoelectric transducer element (5) so as to force a portion of the fluid through said opening of said pressurized chamber (3) and also for detecting a change in an electrical property of said at least one piezoelectric transducer element in response to a change in a pressure applied to said at least one piezoelectric element (5); and an operating element (14) having a piston (13) extending therefrom, said operating element (14) being part of a pump, and wherein the pressurized chamber (3) has at least one pressurized duct (12) extending from the opening (11) to an exterior of the pressurized chamber, said pressurized duct (12) having a cross-sectional area smaller than a cross-sectional area of the pressurized chamber (3), and the piston (13) having a cross-sectional area corresponding to the cross-sectional area of the pressurized duct (12) so that the piston (13) fits slidably and sealingly in the pressurized duct (12).

3. An electromechanical transducer comprising at least one piezoelectric transducer element including a plurality of piezoceramic platelets and structured to convert an electrical signal applied to said at least one piezoelectric transducer element into a reversible deformation of said at least one piezoelectric transducer element and also convert a force applied to said at least one piezoelectric transducer element into an electrical signal, a pressurized chamber (3) with an opening (11), a fluid (4) filling said pressurized chamber, said at least one piezoelectric transducer element (5) being located in said pressurized chamber (3), and means (7) for making an electrical connection to said at least one piezoelectric transducer element for applying a voltage to said at least one piezoelectric transducer (5) to deform said at least one piezoelectric transducer element (5) so as to force a portion of said fluid through said opening of said pressurized chamber (3) and also for detecting a change in an electrical property of said at least one piezoelectric transducer element in response to a change in a pressure applied to said at least one piezoelectric element (5), and wherein said means for making an electrical connection includes spring-like resilient conductive contact pieces (18) electrically connected to said piezoceramic platelets, said contact pieces providing said electrical connection to said piezoceramic platelets in an activated deformed state thereof.

4. An electromechanical transducer comprising at least one piezoelectric transducer element (5) structured to convert an electrical signal applied to said at least one piezoelectric transducer element into a reversible deformation of said at least one piezoelectric transducer element and also convert a force applied to said at least one piezoelectric transducer element into an electrical signal, a pressurized chamber (3) with an opening (11), a fluid (4) filling said pressurized chamber, said at least one piezoelectric transducer element (5) being located in said pressurized chamber (3), and means (7) for making an electrical connection to said at least one piezoelectric transducer element for applying a voltage to said at least one piezoelectric transducer (5) to deform said at least one piezoelectric transducer element (5) so as to force a portion of said fluid through said opening of said pressurized chamber (3) and also for detecting a change in an electrical property of said at least one piezoelectric transducer element in response to a change in a pressure applied to said at least one piezoelectric element (5); an operating element (14) having a piston (13) extending therefrom, said pressurized chamber (3) having at least one pressurized duct (12) extending from said opening (11) to an exterior of said pressurized chamber, said pressurized duct (12) having a cross-sectional area smaller than a cross-sectional area of said pressurized chamber (3), and said piston (13) having a cross-sectional area corresponding to said cross-sectional area of said pressurized duct (12) so that said piston (13) fits slidably and sealingly in said pressurized duct (12); a housing and a cover closing the housing;

wherein said housing and said cover containing said pressurized chamber and said cover has a flat contact surface, said pressurized duct is formed in said cover and said operating element is movable by applying a voltage to said at least one piezoelectric transducer element via said means for making an electrical connection with said at least one piezoelectric transducer element from a position completely below said contact surface in which said operating element cannot be touched and to a position protruding above said contact surface so that said operating element can be touched to form a module for translating tactile information.

5. An array of said modules as defined in claim 14, said modules being spaced from each other in an equi-spaced matrix with said contact surfaces forming a plane and control means for controlling the means for making electrical connection of each of said modules to produce a three-dimensional representation of information detectable by touch.

6. An electromechanical transducer comprising at least one piezoelectric transducer element (5) structured to convert an electrical signal applied to said at least one piezoelectric transducer element into a reversible deformation of said at least one piezoelectric transducer element and also convert a force applied to said at least one piezoelectric transducer element into an electrical signal, a pressurized chamber (3) with an opening (11), a fluid (4) filling said pressurized chamber, said at least one piezoelectric transducer element (5) being located in said pressurized chamber (3), and means (7) for making an electrical connection to said at least one piezoelectric transducer element for applying a voltage to said at least one piezoelectric transducer (5) to deform said at least one piezoelectric transducer element (5) so as to force a portion of said fluid through said opening of said pressurized chamber (3) and also for detecting a change in an electrical property of said at least one piezoelectric transducer element in response to a change in a pressure applied to said at least one piezoelectric element (5); an operating element (14) having a piston (13) extending therefrom, said pressurized chamber (3) having at least one pressurized duct (12) extending from said opening (11) to an exterior of said pressurized chamber, said pressurized duct (12) having a cross-sectional area smaller than a cross-sectional area of said pressurized chamber (3), and said piston (13) having a cross-sectional area corresponding to said cross-sectional area of said pressurized duct (12) so that said piston (13) fits slidably and sealingly in said pressurized duct (12); and a resilient contacting element (24), two electrical contact terminals (26) and an operating spring (25) connected to the resilient contacting element (24) and to the operating element (14) so that the resilient contacting element (24) is moveable between the two electrical contact terminals (26) when the operating element (14) is moved by the fluid being forced from the pressurized chamber (3) by application of the voltage so as to form a relay.

7. An electromechanical transducer comprising at least one piezoelectric transducer element (5) structured to convert an electrical signal applied to said at least one piezoelectric transducer element into a reversible deformation of said at least one piezoelectric transducer element and also convert a force applied to said at least one piezoelectric transducer element into an electrical signal, a pressurized chamber (3) with an opening (11), a fluid (4) filling said pressurized chamber, said at least one piezoelectric transducer element (5) being located in said pressurized chamber (3), and means (7) for making an electrical connection to said at least one piezoelectric transducer element for applying a voltage to said at least one piezoelectric transducer (5) to deform said at least one piezoelectric transducer element (5) so as to force a portion of said fluid through said opening of said pressurized chamber (3) and also for detecting a change in an electrical property of said at least one piezoelectric transducer element in response to a change in a pressure applied to said at least one piezoelectric element (5); an operating element (14) having a piston (13) extending therefrom, said pressurized chamber (3) having at last one pressurized duct (12) extending from said opening (11) to an exterior of said pressurized chamber, said pressurized duct (12) having a cross-sectional area smaller than a cross-sectional area of said pressurized chamber (3), and said piston (13) having a cross-sectional area corresponding to said cross-sectional area of said pressurized duct (12) so that said piston (13) fits slidably and sealingly in said pressurized duct (12); and a pressure transmitting element (20); a biasing spring (40) connecting said at least one piezoelectric transducer element (5) to said pressure transmitting element (20); and additional pistons (23,33) arranged between said pressure transmitting element (20) and said at least one piezoelectric transducer element (5) to contact said fluid (4) in said pressurized chamber (3), said additional pistons being connectable and disconnectable mechanically with said pressure transmitting element (20) by connecting rods (21) and/or said spring (40) being structured so as to form a force detector having an adjustable sensitivity and/or a linear response.

8. An electromechanical transducer comprising at least one piezoelectric transducer element (5) structured to convert an electrical signal applied to said at least one piezoelectric transducer element into a reversible deformation of said at least one piezoelectric transducer element and also convert a force applied to said at least one piezoelectric transducer element into an electrical signal, a pressurized chamber (3) with an opening (11), a fluid (4) filling said pressurized chamber, said at least one piezoelectric transducer element (5) being located in said pressurized chamber (3), and means (7) for making an electrical connection to said at least one piezoelectric transducer element for applying a voltage to said at least one piezoelectric transducer (5) to deform said at least one piezoelectric transducer element (5) so as to force a portion of said fluid through said opening of said pressurized chamber (3) and also for detecting a change in an electrical property of said at least one piezoelectric transducer element in response to a change in a pressure applied to said at least one piezoelectric element (5); an operating element (14) having a piston (13) extending therefrom, said pressurized chamber (3) having at least one pressurized duct (12) extending from said opening (11) to an exterior of said pressurized chamber, said pressurized duct (12) having a cross-section area smaller than a cross-sectional area of said pressurized chamber (3), and said piston (13) having a cross-sectional area corresponding to said cross-sectional area of said pressurized duct (12) so that said piston (13) fits slidably and sealingly in said pressurized duct (12); and a drive shaft, an eccentric element (35) rigidly attached to said drive shaft and a connecting rod rigidly connecting said piston and said eccentric element so as to form a motor.

* * * * *